United States Patent
Rotstein et al.

(10) Patent No.: US 6,289,228 B1
(45) Date of Patent: Sep. 11, 2001

(54) METHOD AND APPARATUS FOR REDUCING POWER CONSUMPTION OF A COMMUNICATION DEVICE

(75) Inventors: Ron Rotstein, Buffalo Grove; Robert J. Corke, La Grange; Daniel G. Prysby, Elk Grove Village; Yehuda Luz, Buffalo Grove, all of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/357,494

(22) Filed: Jul. 20, 1999

(51) Int. Cl.[7] ............................... H04B 1/38; H04M 1/00
(52) U.S. Cl. ........................ 455/574; 455/343; 340/7.32
(58) Field of Search .................................... 455/343, 574, 455/38.3; 340/7.32, 7.33, 7.36; 370/342

(56) References Cited

U.S. PATENT DOCUMENTS

| 5,491,718 | 2/1996 | Gould et al. ........................ 375/205 |
| 5,737,327 | 4/1998 | Ling et al. ............................ 370/335 |
| 5,745,860 | * 4/1998 | Kallin .................................. 455/343 |
| 6,138,001 | * 10/2000 | Nakamura ............................ 455/343 |

* cited by examiner

Primary Examiner—Nguyen T. Vo
(74) Attorney, Agent, or Firm—Brian M. Mancini (57) ABSTRACT

A method of reducing power consumption in a communication device includes a step of acquiring a signal on a common pilot channel of a radio communication system. A next step includes detecting predetermined bits in the signal on the common pilot channel indicating activity on paging channels of the radio communication system. When no paging channel activity is indicated in the second step, a last step includes powering down portions of the electrical circuitry of the communication device so as to reduce power consumption, and when paging channel activity is indicated in the second step, a next step includes powering up portions of the electrical circuitry of the communication device such that those paging channels indicating activity are monitored by the communication device.

19 Claims, 4 Drawing Sheets

— PRIOR ART —

METHOD AND APPARATUS FOR REDUCING POWER CONSUMPTION OF A COMMUNICATION DEVICE

FIELD OF THE INVENTION

The present invention relates generally to digital communication. More particularly, the present invention relates to a method and apparatus for reducing power consumption in a spread spectrum communication system such as a code division multiple access (CDMA) cellular telephone system.

BACKGROUND OF THE INVENTION

Code division multiple access systems such as direct sequence (DS-CDMA) communication systems have been proposed for use in cellular telephone systems operating at 800 MHz and in the personal communication system (PCS) frequency band at 1800 MHz. In a DS-CDMA system, all base stations in all cells may use the same radio frequency for communication. Base stations are uniquely identified in the system by uniquely-assigned spreading codes. Two specified pseudorandom noise (PN) sequences of $2^{15}$ bits length are used by all the base stations. In a quadrature modulated system, one sequence is used for the in-phase (I) channel spreading of the I channel symbols and the other is used for the quadrature (Q) channel spreading of the Q channel symbols. Mobile stations in the system possess the same two $2^{15}$ bits length spreading codes and use them for the initial de-spread of the I and Q channels.

Before the spreading on the I and Q channels, the symbols for transmission are spread using a process known as Walsh covering. When in a call, each mobile station is assigned a unique Walsh code by the base site to ensure that transmission to each mobile station within a given cell is orthogonal to transmission to every other mobile station, assuming that a different Walsh code is used for each mobile station. In this manner, traffic channels are established for two-way communication between a base station and a mobile station.

In addition to traffic channels, each base station broadcasts a pilot channel, a synchronization channel, and a paging channel. The pilot channel is formed by a constant level signal that is covered by Walsh code 0, which consists of all the same bits. The pilot channel is commonly received by all mobile stations within range and is used by the mobile station for: identifying the presence of a CDMA system, initial system acquisition, idle mode hand-off, identification of initial and delayed rays of communicating and interfering base stations, and for coherent demodulation of the synchronization, paging, and traffic channels. At the mobile station, the received RF signals include pilot, synchronization, paging, and traffic channels from all nearby base stations.

Figure 1:
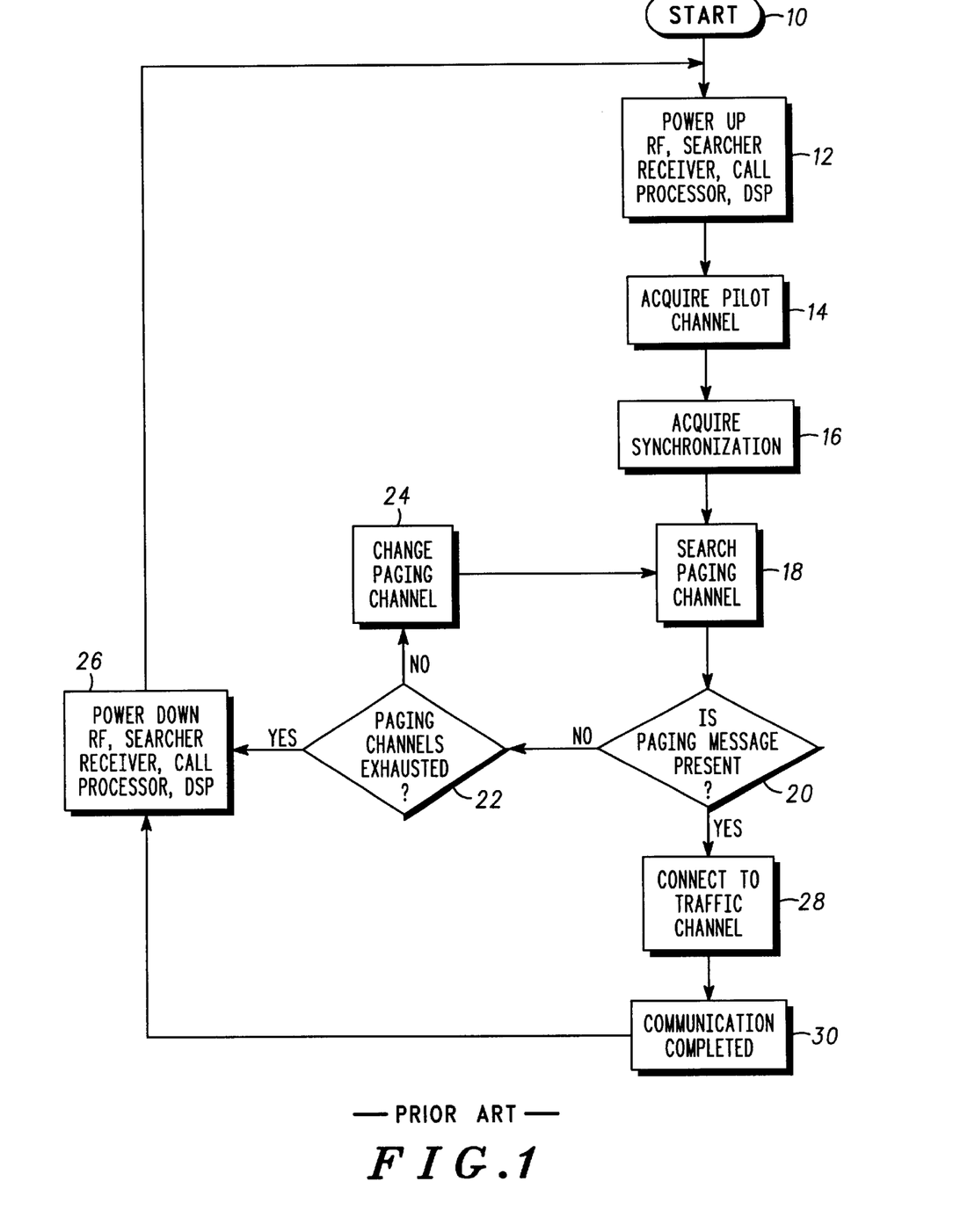
FIG. 1 is a simplified flow diagram of a prior art system to monitor calls.

Referring to FIG. 1, a typical process for a mobile station to receive incoming calls is shown. At the start 10, a mobile unit will power up 12 various circuitry to complete a call. This includes powering up the RF portions of the mobile unit, the receiver circuits including a receiver search, and a digital signal processor (DSP) including a call processor as are known in the art. Once the mobile is powered up, the mobile unit proceeds to acquire 14 the pilot channel from the base station. Once the pilot channel is acquired the mobile unit will acquire synchronization 16 which aligns the timing of the mobile unit with the base station. The mobile station synchronizes to the base station by correlation to a unique Walsh code on the synchronization channel. Typically, mobile stations use a correlator as a receiver pilot searching element to serially search for the PN phases of the receivable pilots. Knowledge of the correct I and Q channel spreading PN phases of the base station(s) with which the mobile station communicates allows the coherent detection of all the other code channels transmitted by the base station.

Once the mobile is synchronized with the base station, the mobile will monitor the paging channels either continuously or intermittently (slotted mode) to see if there is any incoming call activity for the mobile. Monitoring the paging channels includes search a paging channel 18 to see if a paging message for the particular mobile unit is present 20. If no message is present, the mobile unit will check if it has searched all available paging channels 22. If not, the mobile unit will change RF frequency to tune to another paging channel 24. The mobile unit will search all the available paging channels in this way. If no paging message is found the mobile unite will power down 26 its RF portions, the receiver circuits including the receiver search, and the digital signal processor (DSP) including the call processor and return to an idle or sleep state until it is time again to check for paging messages. If a paging message is eventually found the mobile and base station will set up and connect to a traffic channel 28 for transmitting and receiving the call indicated by the paging message to connect to the base station. At this time the mobile unit and base station proceeds with the transfer of information (voice, data, etc.) until the communication is completed 30. Upon completion, the mobile unit powers down its circuitry 26 as before and returns to an idle state.

In accordance with the above procedure, three different channels (pilot, synchronizing, paging) are needed to be monitored to see if there is an incoming call waiting for the mobile. Unfortunately, acquiring all three channels takes time and power, and may not always be successful. In addition, the mobile unit must identify all the pilot signals that are receivable including the pilot signal from the base station with the strongest pilot channel.

The prior art pilot channel searching method creates further limitations for all of the other uses of the pilot channel after initial system acquisition. Typical DS-CDMA mobile station receivers utilize a rake receiver having three or more independently controlled fingers which are time aligned to the correct PN sequence phases using knowledge of the pilot channel phases determined by the receiver pilot phase searching element. The rake fingers are normally assigned to the strongest rays received from all communicating base stations as determined by the receiver pilot phase searching element. Ray assignments are updated in a maintenance process using the pilot phase searching element information. If the pilot phase searching element is slow, resulting in slow maintenance of the assignment of the strongest rays to the rake fingers, the receiving performance of the mobile station is degraded under fading conditions.

Idle hand-off is the process of attaching to and listening to the paging channel of the base station with the strongest pilot as identified by the pilot searching element. When the mobile station receives a page or accesses the system to place a call, it is important that the mobile station is listening to the page from, or tries to access, the base station associated with the strongest received pilot. This requires a fast pilot phase searching element, particularly when the mobile station is in motion.

A portable station may have to search the possible phase space of as many as twenty base stations every time it wakes up. To reliably receive the paging slot after waking up, the portable station must be listening to the base station which is providing adequate signal strength. When the mobile station is in motion, the correct base station to decode can easily change from one paging interval to the next paging interval. Therefore it is very important to have a fast pilot searching mechanism to identify the correct base station pilot before the start of the assigned paging slot.

For battery powered portable mobile stations it is also very important to conserve battery charge when waiting for pages. DS-CDMA provides a slotted mode that allows portable stations to power down except for the periods when their assigned paging slot information is transmitted by the base stations. The paging slot interval can be as short as 1.28 seconds and periods of 1.28 seconds multiplied by powers of two for more battery savings. During these intervals, the mobile station "sleeps" in a low power mode. However, using the prior art pilot searching mechanism requires the portable station to wake up well before the paging slot to allow sufficient time to sequentially search the PN sequence phase space. This negates a substantial part of the potential battery savings afforded by slotted mode.

There has been a proposal (for TIA/EIA interim standard IS-95C) for an addition Walsh channel, in addition to the pilot, paging, synchronization, and traffic channels, dedicated for paging activity. However, this still requires the mobile to acquire multiple channels.

Accordingly, there is a need for an apparatus and method for a mobile unit that avoids the problems associated with acquiring multiple channels to see if an incoming call is present. There is also a need to improve on battery savings of a mobile while providing simpler operation. It would also be an advantage to eliminate some of the problems associated with: pilot searching, maintaining system acquisition, soft hand-off, and slotted mode timing and operation.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF THE PREFERRED EMBODIMENT

The present invention provides a method and apparatus for a mobile unit to determine if an incoming call is waiting by monitoring only one channel in a communication system. The present invention improves battery savings of a mobile while providing simpler operation, and eliminates some of the problems associated with: pilot searching, maintaining system acquisition, soft hand-off, and slotted mode timing and operation.

Figure 2:
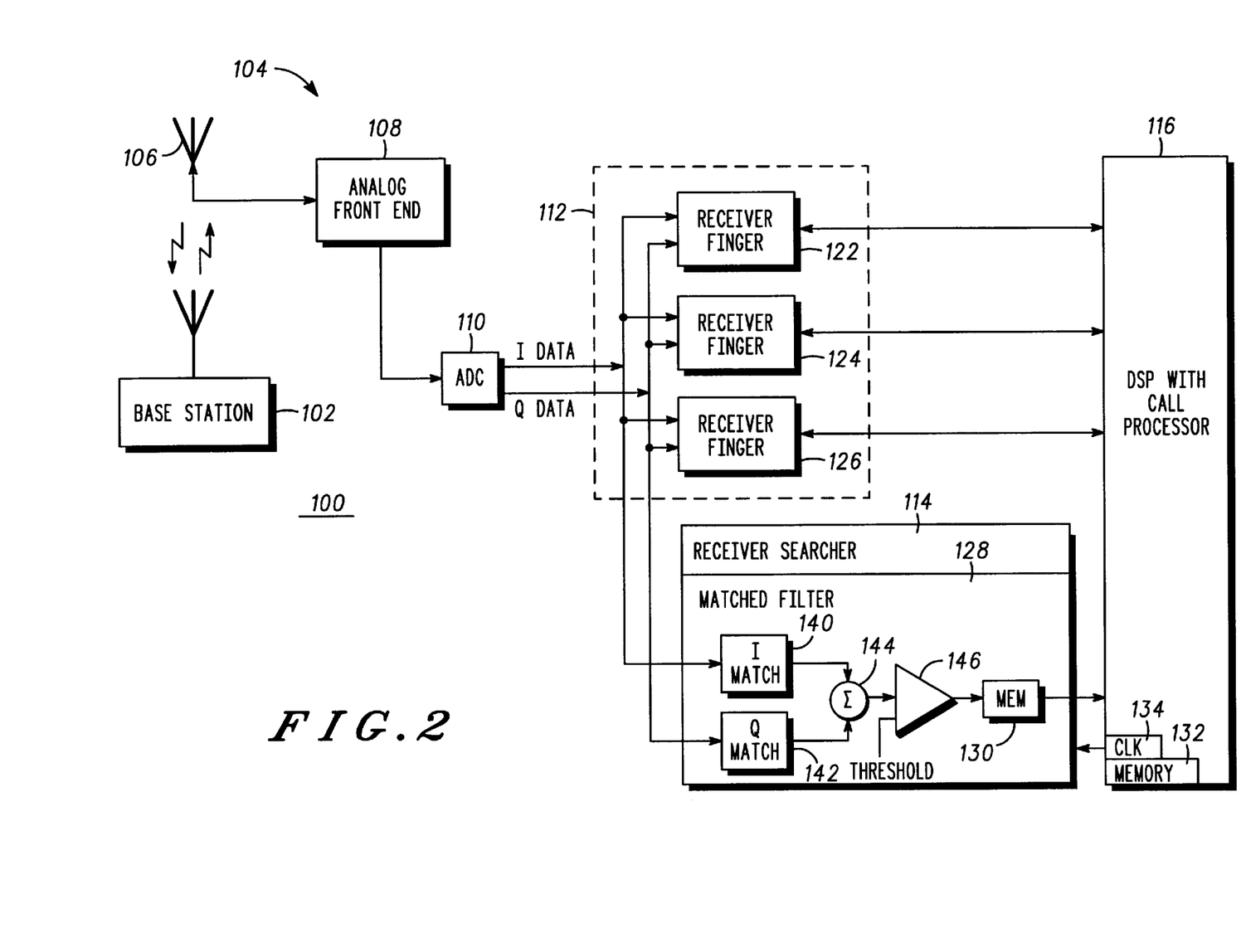
FIG. 2 is a simplified block diagram of a communication system, in accordance with the present invention.

FIG. 2 shows a communication system usable in the present invention. The communication system 100 includes a plurality of base stations such as base station 102 configured for radio communication with one or more mobile stations such as radiotelephone 104. The radiotelephone 104 is configured to receive (and transmit) direct sequence code division multiple access (DS-CDMA) signals to communicate with the plurality of base stations, including base station 102. In the illustrated embodiment, the communication system 100 operates according to TIA/EIA Interim Standard IS-95, "Mobile Station-Base Station Compatibility Standard for Dual-Mode Wideband Spread Spectrum Cellular System," operating at 800 MHz. Alternatively, the communication system 100 could operate in accordance with other CDMA systems including PCS systems at 1800 MHz.

The base station 102 transmits spread spectrum signals to the radiotelephone 104. During communication the symbols on the traffic channels are spread using a pseudorandom noise (PN) Walsh code in a process known as Walsh covering, as is known in the art. Each mobile station such as the radiotelephone 104 is assigned a unique Walsh code by the base station 102 so that the traffic channel transmission to each mobile station is orthogonal to traffic channel transmissions to every other mobile station. The spread signals are quadrature modulated to form in-phase (I) and quadrature-phase (Q) signals. The I and Q signals are each spread using two specified PN sequences, typically $2^{15}$ bits in length. The same I and Q spreading sequences are used by all base stations in the communication system 100.

In addition to traffic channels, the base station 102 broadcasts a pilot channel, a synchronization channel, and a paging channel. As is used in the art, the pilot channel is formed by a constant level signal that is covered by Walsh code (0), which consists of bits all being the same. No decoding is necessary when the pilot channel is encoded using Walsh code (0) and a pilot channel decoder may be omitted. However, if another Walsh code or another type of coding is used to encode the pilot channel, a decoder is necessary. Such a decoder applies a pilot code to the despread signal to produce the pilot channel signal. Preferably, the pilot code is common to all mobile units and the pilot channel is commonly received by all mobile units within range. The pilot channel is used by the radiotelephone 104 for identifying the presence of a CDMA system, initial system acquisition, idle mode hand-off, identification of initial and delayed rays of communicating and interfering base stations, and for coherent demodulation of the synchronization, paging, and traffic channels. The synchronization channel is used for synchronizing mobile station timing to base station timing. The paging channel is used for sending paging information from the base station 102 to mobile stations including the radiotelephone 104.

In the present invention, a few bits of paging channel status information is punctured on the common pilot channel. These bits give an indication if there is any activity on the paging channels and which paging channels are active. A mobile unit, such as the radiotelephone 104, periodically polls the pilot channel to check these bits. Based on the status of the bits, the mobile unit would only do paging channel processing if there were an active paging channel, and only on those paging channels indicating activity. In this way, mobile unit idle power would be reduced proportionally to the average reduction in processing required to monitor the paging channels regardless of the number of active paging channels.

In particular, the present invention provides a method and apparatus for reducing power consumption in a communication device having electrical circuitry. The invention firstly involves a search for, and lock onto, the common pilot channel. Subsequently, the predetermined bits punctured on the pilot channel are detected. The bits specify which of any paging channels are active. If none of the paging channels are indicated as active, the mobile unit will not activate the DSP, not acquire the synchronization or paging the pilot channel are detected. The bits specify which of any paging channels are active. If none of the paging channels are indicated as active, the mobile unit will not activate the DSP, not acquire the synchronization or paging channels and instead go directly to sleep mode, thus shortening the time in poll mode and eliminating the power consumption phases of the poll cycle. Only if the bits specify that there are active paging channels will the mobile unit proceed to acquire the synchronization channel and read the paging channel. As the number of bits punctured on the pilot channel is small (approximately 4–8 bits per slot), the degradation in the channel estimate and searcher results that are normally used by the radiotelephone during pilot channel acquisition is negligible as no I, Q phase distortion is introduced. It is estimated that the channel degradation for an 8-bit puncture would be about 0.45 dB on the pilot integration of a twenty symbol accumulation.

The advantage of the present invention is that the processing time to check for pages is reduced as only those paging channels having activity are monitored, and the power consumption of the mobile unit is reduced, as a preliminary decision to monitor paging channels can be made without turning on all of the receiver or DSP circuitry of the mobile unit. Also, the present invention takes advantage of the fact that there are significant periods of time in which there are no active pages in a specific location. When there are no active pages, power is minimized due to the fact that the synchronization and paging channels do not require monitoring.

Specifically, when there is no paging channel activity shown by the bits punctured on the pilot channel, the present invention allows for the time to poll, TPOLL, to be much shorter than the prior art. For example, the steps involved in polling for and detecting a paging message in a prior art CDMA system includes first having the mobile unit powering up its receiver and doing a pilot search. This step involves turning on the analog front end 108, ADC 110, receiver searcher 114, the call processor of the DSP 116 and takes approximately 80 ms to perform but can vary depending on signal conditions and the number of paging channels to be searched. Secondly, the mobile unit acquires the synchronization channel, which involves turning on the entire receiver (including the receiver fingers 122, 124, 126, matched filter 128 and receiver searcher 114) and the entire DSP 116 and takes approximately another 80 ms to perform. Third, the mobile unit reads the paging channels and processes the results. This takes approximately another 80 ms for a total poll time, TPOLL, of about 240 ms. and doing a pilot search which would take the same amount of time and power as in the prior art. However, the mobile unit then only needs to check the punctured bits on the pilot channel to detect a paging message, without powering on any more circuits or monitoring the synchronization of paging channels. Checking the bits takes a negligible amount of time, and results in a total poll time, $T_{POLL}$, of about 80 ms, much less than the 240 ms in the prior art. The present invention reduces the poll duration by about 60–70% during periods when there is no paging activity. Further, the present invention reduces power consumption during polling mode, $P_{POLL}$, by about 80% due to the fact that the DSP does not have to wake up during a no page situation. The formula for total power consumption is given by $$P_{TOTAL} = P_{POLL}\left(\frac{T_{POLL}}{(T_{POLL} + T_{SLEEP})}\right) + P_{SLEEP}\left(\frac{T_{SLEEP}}{(T_{POLL} + T_{SLEEP})}\right)$$

where $P_{SLEEP}$ is the power consumed by the mobile unit during sleep mode and $T_{SLEEP}$ is the time the mobile unit is powered down between paging channel polls. It is observed the acquiring the synchronization channel and reading the paging channels are the biggest power consumers during a polling cycle in the prior art. These steps are avoided in the present invention.

Figure 3:
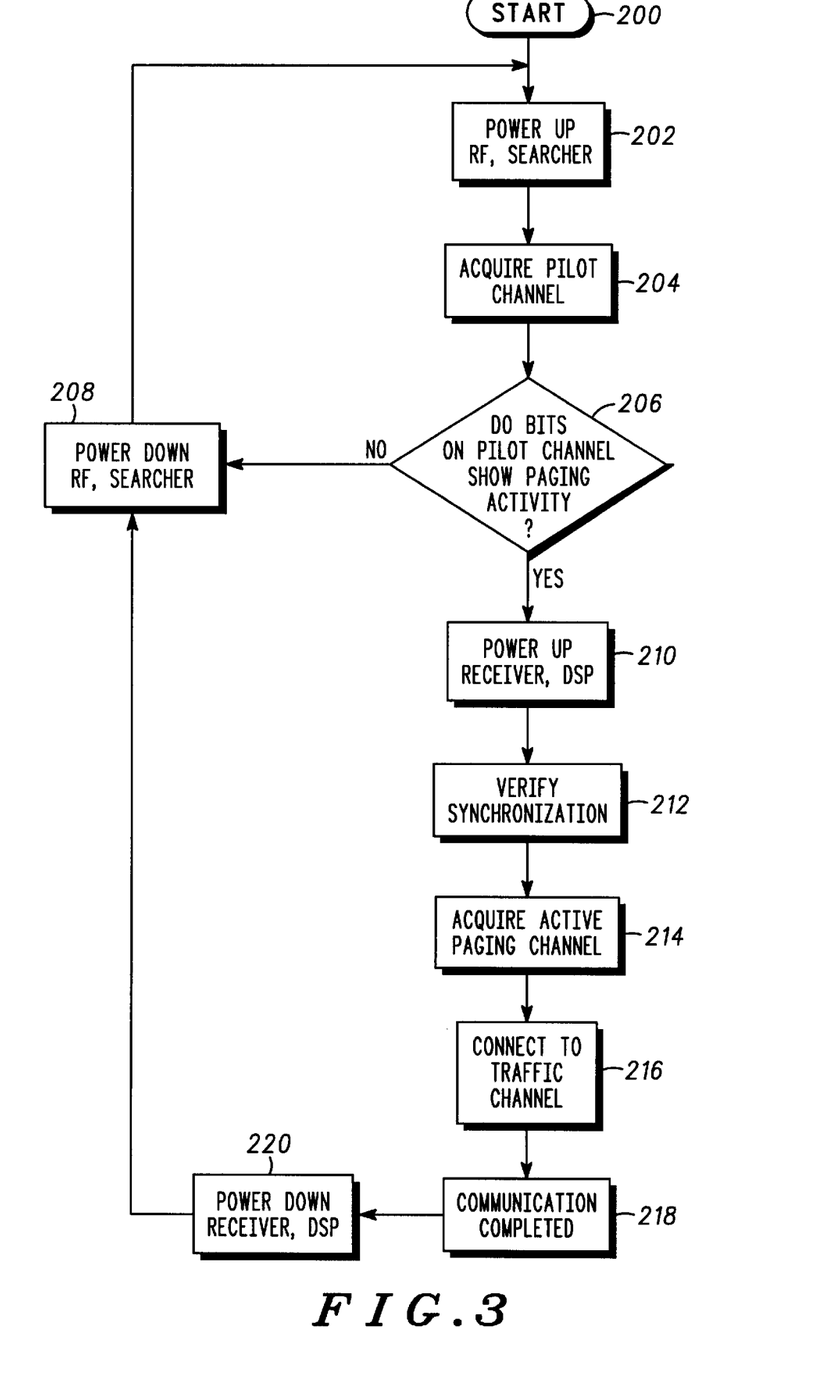
FIG. 3 is a simplified flow diagram illustrating operation of the communication system of FIG. 2.

Referring now to FIG. 3 (and referencing FIG. 2), a flow diagram is shown illustrating a method of reducing power consumption in a communication device having electrical circuitry, such as a CDMA radiotelephone, in accordance with a preferred embodiment of the present invention. The method begins at step 200. At step 202, operation of the radiotelephone 104 is initiated. For example, operating power to the RF section and receiver searcher portion of the receiver in the radiotelephone 104 is turned on. At this point, the radiotelephone 104 attempts to identify and acquire the system. The method includes a step 204 of acquiring a signal on a common pilot channel of a radio communication system. This is usually done at turn on or after the communication device awakes after sleep mode.

This step 204 includes a substep of having the radiotelephone 104 tune to an RF channel. The analog front end 108 is used for selecting a particular RF channel received through the antenna 106. The RF channel may be predefined by the communication system 100 according to a system protocol, such as IS-95. Alternatively, the RF channel may be located somewhere in one or more ranges of frequencies, as is the case in many PCS systems operating around 1800 MHz.

The receiver searcher 114, under control of the DSP 116, examines the stream of received data provided by the ADC 110. The data includes detected PN sequences corresponding to spread RF signals received from one or more base stations, such as base station 102. The matched filter 128 compares detected PN sequences and a predetermined PN sequence and produces a response. The response may be stored in the memory 130 or the memory 132, or elsewhere. The predetermined PN sequence is maintained at the radiotelephone 104, for example in the memory 130 or the memory 132. The predetermined PN sequence is, for example, 512 chips long. The matched filter 128 captures the pilot energies of all receivable base transmissions during a predetermined time duration. The preferred predetermined time duration for an IS-95 DS-CDMA communication system such as communication system 100 is 26-⅔ milliseconds, which is the time required for repeat of all phases of the PN sequences used to spread the I and Q channels. The matched filter 128 may examine either the I channel or the Q channel. Alternatively, the matched filter 128 could include an I channel matched filter for the I channel and a Q channel matched filter for the Q channel, combining the outputs of the two matched filters for improved accuracy.

The controller DSP 116 examines the response produced by the matched filter 128. If a DS-CDMA system is present, the response will include a strong match indication corresponding to the phase of a base station in the vicinity of the radiotelephone 104. The response may include a match set, which is two or more closely clustered strong match indications. These strong match indications correspond to multiple strong rays received from a single base station, delayed in time. Presence of a single strong match indication or a match set indicates a DS-CDMA system is present. Concurrent with this, the response includes predetermined bits punctuated on the pilot channel signal which are passed to the DSP 116.

A next step 206 includes, the DSP 116 detecting predetermined bits in the signal on the common pilot channel indicating activity on paging channels of the radio communication system. The predetermined bits indicate if there is activity on the paging channels and which of the paging channels are active. This is an advantage over the prior art in that it is not necessary to subsequently monitor all the paging channels to detect paging activity and can be done using the ASIC part of the DSP.

Preferably, the predetermined bits of the detecting step include n bits punctuating a Walsh code of 0 comprising the signal on the pilot channel, the n bits indicating which paging channels are active. More preferably, the n bits of the detecting step are located in predetermined locations within a paging slot of data and punctuate the slot such that degradation in a channel estimate and searcher results derived from the pilot channel are minimized.

If at step 206, the DSP determines that no activity is indicated, the call processor of the DSP 116 powers down portions of the electrical circuitry of the communication device so as to reduce power consumption. Specifically, the RF portion, the searcher portion of the receiver, and the call processor itself are powered down 208 such that the radiotelephone returns to sleep mode. However, if at step 206, the DSP determines that activity is indicated in the detecting step, the call processor of the DSP 116 powers up 210 further portions of the electrical circuitry of the communication device including the rest of the receiver circuitry and the rest of the DSP circuitry.

At step 212, the radiotelephone 104 detects the synchronization channel and verifies system synchronization. In response to the synchronization channel, timing of the radiotelephone 104 is synchronized to the timing of the base station 102 which transmitted the synchronization channel.

At step 214, the radiotelephone 104 acquires the active paging channel broadcast by the base station that had been indicated as active by the predetermined bits punctured on the pilot channel. The paging channel includes system information, referred to as a System Parameters Message, intended for all mobile stations in communication with the base station. The paging channel may also include a page or other information directed to the radiotelephone 104.

At step 216, the radiotelephone coordinates with the base station to connects to a traffic channel so as to exchange the paging, voice or data information.

Once the communication is completed at step 218, the radiotelephone includes a substep 220 (and 208) of powering down the portions of the electrical circuitry of the communication device including all of the receiver circuitry including the receiver searcher, all of the DSP circuitry including the call processor, and the RF circuitry of the radiotelephone, and returning to sleep mode at the beginning, step 200. Further, a substep can be included of maintaining the power off of the portions of the electrical circuitry of the communication device until a next slot of the pilot signal following the first slot, wherein at the next slot continuing at step 202. For example, the radiotelephone is maintained in a low-power mode (referred to as sleep mode or slotted mode battery savings), periodically interrupted by an active mode. Sleep mode is a low-power mode for reducing battery consumption, thereby extending battery life. In sleep mode, high-power circuit elements such as the analog front end 108, the ADC 110, and the rake receiver 112 are powered down. The radiotelephone enters sleep mode for a predetermined time. In accordance with IS-95, sleep mode continues for a duration of 1.28 seconds, or powers of two multiples thereof. The controller identifies a strongest DS-CDMA pilot signal based on the response upon entering the active mode.

The present invention can provide further benefit by adding steps for receiving a second set of predetermined bits so as to provide an estimate of channel gain.

In all of the above cases, the radio communication system of the detecting step is at least one of a personal digital cellular (PDC) system, a Japan digital cellular (JDC) system, a code division multiple access (CDMA) system, a direct sequence code division multiple access (DS-CDMA) system, a groupe speciale mobile (GSM) system, and a slotted paging mode groupe speciale mobile (GSM-DRX) system. Other possible systems include AMPS (Advanced Mobile Phone Service) systems, GSM (Global System for Mobile communication) systems, TDMA (time division multiple access) systems such as the North American Digital Cellular, satellite systems, such as the Iridium system proposed by Iridium, LLC, or cordless systems such as DECT (Digital Extended Cordless Telephone) or PHS (Personal Handyphone System).

In operation, the above method provides a method of reducing power consumption in a communication device having analog receiver circuitry, digital receiver circuitry including searcher circuitry in a portion thereof, and a digital signal processor including call processor circuitry in a portion thereof. The method includes a first step of providing analog receiver circuitry coupled to digital receiver circuitry including searcher circuitry in a portion thereof and a digital signal processor including call processor circuitry in a portion thereof, in a powered off sleep mode. A second step includes powering on the analog receiver circuitry, the searcher circuitry, and the call processor circuitry such that the analog receiver circuitry is operable to receive signals from a radio communication system. A third step includes sensing a signal of a common pilot channel through the analog receiver circuitry and coupled to the searcher circuitry. A fourth step includes processing the signal from the sensing step by the call processor circuitry so as to retrieve predetermined bits indicate activity on paging channels of the radio communication system. When no activity is indicated in the processing step, a last step includes powering down the analog receiver circuitry, searcher circuitry, and call processor circuitry of the communication device so as to reduce power consumption. When activity is indicated in the processing step, a fifth step includes powering up the digital receiver circuitry and the digital signal processor such that those paging channels indicating activity are monitored by the communication device.

The present invention also incorporates an apparatus for reducing power consumption in a communication device. The apparatus includes: analog receiver circuitry to receive signals from a communication system and digital receiver circuitry including searcher circuitry in a portion thereof. The digital receiver circuitry provides a baseband demodulated data stream from the incoming signals coupled from the analog receiver circuitry. The searcher circuitry detects a common pilot channel signal in the data stream. A digital signal processor includes call processor circuitry in a portion thereof. The digital signal processor decodes messages in the data stream, and the call processor retrieves predetermined bits indicating activity on paging channels of the radio communication system.

The analog receiver circuitry, the searcher circuitry, and the call processor circuitry are powered on from an initial sleep mode such that call processor can retrieve predetermined bits indicate activity on paging channels of the radio communication system. Where no activity is indicated by the predetermined bits, the analog receiver circuitry, the searcher circuitry, and the call processor circuitry are powered down so as to reduce power consumption. Where activity is indicated by the predetermined bits, the digital receiver circuitry and the digital signal processor are powered up such that those paging channels indicating activity are monitored by the communication device. After those paging channels indicating activity have been monitored by the communication device and any incoming calls received by the radio communication device have been completed, the analog receiver circuitry, the digital receiver circuitry and the digital signal processor can be powered down. by the communication device and any incoming calls received by the radio communication device have been completed, the analog receiver circuitry, the digital receiver circuitry and the digital signal processor can be powered down.

Figure 4:
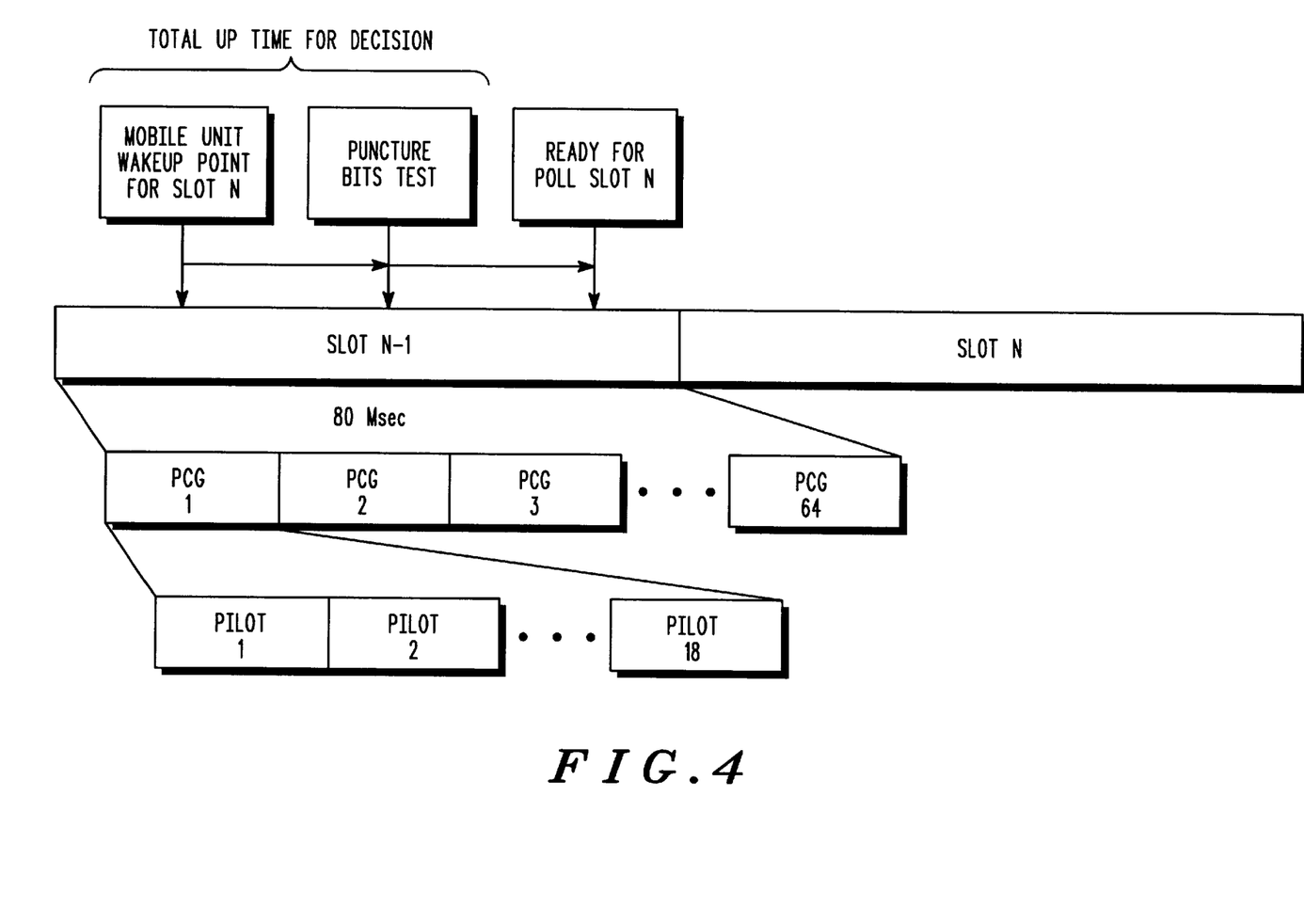
FIG. 4 is a diagram illustrating the relationship of punctured bits in a paging channel slot, in accordance with the present invention.

FIG. 4 shows the timing of detecting punctured bits in pilot symbols in a paging slot. In a DS-CDMA system, a paging channel slot has a duration of 80 ms: three times the duration of a rollover period of the CDMA system time pseudonoise (PN) generator (26.667 ms) and four times the duration of one frame (20 ms). Eighteen pilot symbols (Pilot j) are contained within 64 pilot channel groups (PCG k) for each paging channel slot. In a typical slotted paging mode CDMA system the radiotelephone will wake up (power up) before Slot N to acquire the pilot channels, synchronization, and poll the paging channels before receiving the paging message in Slot N.

In contrast, the present invention identifies active paging channels that occur in Slot N through n predetermined bits punctured on the pilot symbols of Slot N-1. The radiotelephone will wake up before Slot N to acquire the pilot channels and read the punctured bits identifying active paging channels, and can decide to power down where there are no paging messages indicated. This results in a total up time for a decision of much less than one slot time of 80 ms. In addition, computer simulations show that power consumption in this mode is less than half that of conventional CDMA paging polling.

Preferably, the predetermined punctured bits include at least three bits punctuating a Walsh code of 0 comprising the pilot symbols. The at least three bits indicate paging activity and which of the paging channels are active. More preferably, the punctured bits include four bits at predetermined locations within the paging symbols of a slot. These locations can change from slot to slot. The predetermined locations can be preprogrammed into the radiotelephone or downloaded form the base station. In this way, the radiotelephone will know where the punctured bits are located within any particular slot. The punctured bits can be located in either or both of the I and Q channels of the pilot signal. It is preferred to puncture the bits on both the I and Q channels to maintain signal integrity. It is also preferred to repeat the punctured bits to improve decision integrity. Therefore, in a preferred embodiment, separate control of the bits on the PCG and Pilot symbols can yield one of 144 unique combinations (144=64*18/8 bits, (4 bits repeated)), or control the eight possible pagings per slot.

Referring back to FIG. 2, the radiotelephone 104 comprises an antenna 106, an analog front end 108, a receive path including an analog to the vicinity. Some of the received RF signals are directly transmitted, line of sight rays transmitted by the base station. Other received RF signals are reflected rays and are delayed in time.

Received RF signals are converted to electrical signals by the antenna 106 and provided to the analog front end 108. The analog front end 108 filters the signals and provides conversion to baseband I and Q signals. The analog baseband I and Q signals are provided to the ADC 110, which converts them to streams of I and Q digital data for further processing.

The call processor of the DSP 116 controls the functions of the radiotelephone 104. The call processor operates in response to stored programs of instructions and includes a memory 132 for storing these instructions and other data. The call processor has a clock input 134 for receiving a clock signal. The clock 134 controls timing of the radiotelephone 104. For example, the clock 134 establishes a chip clock signal to control timing of the processing of received PN sequences throughout the radiotelephone 104. The call processor receives from the base station 102 the interval on which the radiotelephone must look for pages. Over this interval, the radiotelephone monitors the pilot channel for up to 160 ms and can sleep the remainder of the time. The call processor coordinates the events in the radiotelephone required for entry into and exit from sleep mode. Such events include keeping track of system time, advancing LSG states, restarting the oscillator, enabling power to the RF portion of the radiotelephone, and restarting the timer clock. The call processor is coupled to other elements of the radiotelephone 104. Such connections are not shown so as to not unduly complicate the drawing figure.

The rake receiver 112 has a plurality of receiver fingers 122, 124, 126. In the illustrated embodiment, the rake receiver 112 includes three receiver fingers. However, any suitable number of receiver fingers could be used.

The receiver fingers are of conventional design. In a manner to be described below, the receiver fingers of the rake receiver 112 are controlled by the controller DSP 116.

The receiver searcher 114 detects pilot signals received by the radiotelephone 104 from the plurality of base stations including the base station 102. In accordance with the invention, the receiver searcher 114 includes a matched filter 128 and a memory 130. The matched filter 128 compares a detected I and Q PN sequence received from the ADC 110 and predetermined PN sequences stored in the memory and produces a response. In the illustrated embodiment, the predetermined PN sequences are stored in the memory 130.

The matched filter 128 receives the I and Q streams of data from the ADC 110. The data correspond to the spread, quadrature modulated signal received from the base station 102, including directly received or initial rays and reflected rays having a time delay. In addition, the data correspond to spread, quadrature modulated signals, direct and reflected, received from other base stations in the communication system 100. The data includes the PN sequences used for spreading the I and Q channels at the base station 102 and at all other base stations.

The matched filter 128 compares the detected I and Q PN sequences with predetermined PN sequences. The predetermined PN sequences correspond to a portion of the $2^{15}$ element short PN sequences used to spread the I and Q channels at all base stations. The radiotelephone 104 includes a storage element such as the memory 130 or the memory 132 which stores a fixed pattern of PN values. The predetermined PN sequence includes the fixed pattern that comprises a predetermined number of chips of a PN sequence, for example the 512 last chips of a PN sequence such as the short PN sequence. The storage element also contains a table corresponding to paging channels which are identified by the predetermined bits punctured on the pilot channel.

In the illustrated embodiment, the pilot signals are quadrature modulated, with each of the pilot signals including in-phase (I) symbols and quadrature-phase (Q) symbols. The I symbols are spread using an I PN sequence and the Q symbols are spread using a Q PN sequence. The matched filter 128 accordingly includes an I filter 140 for comparing a detected I PN sequence and a stored I PN sequence and a Q filter 142 for comparing a detected Q PN sequence and a stored Q PN sequence and producing the response. Either or both of the I filter 140 and Q filter 142 responses may be used as the response of the matched filter 128. The response is passed to the call processor to detect the predetermined bits of the pilot signal. Use of both responses improves the quality of the response of the matched filter 128. In the illustrated embodiment, summing element 144 combines the response of the I filter 140 and the response of the Q filter 142 to produce the response of the matched filter 128. A comparator 146 suppresses the response when the response does not exceed a predetermined threshold. For example, the matched filter will continuously produce the response, even if no CDMA system is present or if only noise is present. The threshold is set to a predetermined value to prevent storage of the response in the memory 130 when is no meaningful input symbols are received.

The matched filter 128 provides a response to the comparison of the detected PN sequence and the predetermined PN sequence. The response in stored, for example in memory 130 or memory 132. In the illustrated embodiment, the response is double buffered. That is, the matched filter 114 stores the response in a first set of memory locations (such as memory 130) as the response is determined. However, it should be recognized that a single memory could be used. The controller DSP 116 reads the response and compares it to the look-up table stored in one of the memory locations (such as memory 132).

Although the invention has been described and illustrated in the above description and drawings, it is understood that this description is by way of example only and that numerous changes and modifications can be made by those skilled in the art without departing from the broad scope of the invention. For example, although the present invention finds particular application in portable cellular radiotelephones, the invention could be applied to any communication device, including pagers, electronic organizers, or computers.

What is claimed is:

1. A method of reducing power consumption in a communication device having electrical circuitry, the method comprising the steps of:
   acquiring a signal on a common pilot channel of a radio communication system while the communication device is in a sleep mode;
   detecting n predetermined bits punctured into a Walsh code of 0 comprising the signal on the common pilot channel, the n bits indicating activity on particular paging channels of the radio communication system; and
   when no activity is indicated in the detecting step, powering down portions of the electrical circuitry of the communication device so as to reduce power consumption, and
   when activity is indicated in the detecting step, powering up portions of the electrical circuitry of the communication device, and monitoring those paging channels indicating activity.

2. The method of claim 1, wherein the n bits of the detecting step are located in predetermined locations punctuating a paging slot such that degradation in a channel estimate and searcher results derived from the pilot channel are minimized.

3. The method of claim 1, wherein the powering up step includes a subsequent substep of powering down the portions of the electrical circuitry of the communication device after those paging channels indicating activity have been monitored by the communication device and any calls received by the radio communication device have been completed.

4. The method of claim 3, wherein the predetermined bits of the detecting step are located in predetermined locations of a first slot of data, and wherein after the powering down substep, further comprising the substep of maintaining the power off of the portions of the electrical circuitry of the communication device until a next slot following the first slot, wherein at the next slot continuing at the acquiring step.

5. The method of claim 1, wherein the monitoring substep of the powering up step includes substeps of acquiring a synchronization channel of the radio communication system so as to synchronize timing of the communication device to the radio communication system, and acquiring and reading those paging channels indicating a ctivity in the detecting step.

6. The method of claim 1, further comprising a step of receiving a second set of predetermined bits so as to provide an estimate of channel gain.

7. The method of claim 1, wherein the radio communication system of the detecting step is at least one of a personal digital cellular (PDC) system, a Japan digital cellular (JDC) system, a code division multiple access (CDMA) system, a direct sequence code division multiple access (DS-CDMA) system, a groupe speciale mobile (GSM) system, and a slotted paging mode groupe speciale mobile (GSM-DRX) system.

8. A method of reducing power consumption in a communication device having analog receiver circuitry, digital receiver circuitry including searcher circuitry in a portion thereof, and a digital signal processor including call processor circuitry in a portion thereof, the method comprising the steps of:
   providing analog receiver circuitry coupled to digital receiver circuitry including searcher circuitry in a portion thereof and a digital signal processor including call processor circuitry in a portion thereof, in a powered off sleep mode;
   powering on the analog receiver circuitry, the searcher circuitry, and the call processor circuitry such that the analog receiver circuitry is operable to receive signals from a radio communication system;
   sensing a signal of a common pilot channel through the analog receiver circuitry and coupled to the searcher circuitry;
   processing the signal from the sensing step by the call processor circuitry so as to retrieve predetermined bits indicate activity on paging channels of the radio communication system; and
   when no activity is indicated in the processing step, powering down the analog receiver circuitry, searcher circuitry, and call processor circuitry of the communication device so as to reduce power consumption, and
   when activity is indicated in the processing step, powering up the digital receiver circuitry and the digital signal processor such that those paging channels indicating activity are monitored by the communication device.

9. The method of claim 8, wherein the predetermined bits of the processing step include n bits punctuating a Walsh code of 0 comprising the signal on the pilot channel, the n bits indicating which paging channels are active.

10. The method of claim 9, wherein the n bits of the processing step are located in a predetermined locations within a slot of data.

11. The method of claim 8, wherein the powering up step includes substeps of acquiring a synchronization channel of the radio communication system so as to synchronize timing of the communication device to the radio communication system, and acquiring and reading those paging channels indicating activity.

12. The method of claim 8, wherein the powering up step includes a substeps of powering down the analog receiver circuitry, the digital receiver circuitry and the digital signal processor after those paging channels indicating activity in the detecting step have been monitored by the communication device and any incoming calls received by the radio communication device have been completed, and continuing at the providing step.

13. A apparatus for reducing power consumption in a communication device, the apparatus comprising:
   analog receiver circuitry to receive signals from a communication system;
   digital receiver circuitry including searcher circuitry in a portion thereof, the digital receiver circuitry to provide a baseband demodulated data stream from the incoming signals coupled from the analog receiver circuitry, the searcher circuitry to detect a common pilot channel signal in the data stream;
   a digital signal processor including call processor circuitry in a portion thereof, the digital signal processor to decode messages in the data stream, the call processor to retrieve predetermined bits indicating activity on paging channels of the radio communication system;
   the analog receiver circuitry, the searcher circuitry, and the call processor circuitry to be powered on from an initial sleep mode such that call processor can retrieve predetermined bits indicate activity on paging channels of the radio communication system; and
   where no activity is indicated by the predetermined bits, the analog receiver circuitry, the searcher circuitry, and the call processor circuitry to be powered down so as to reduce power consumption, and
   where activity is indicated by the predetermined bits, the digital receiver circuitry and the digital signal processor to be powered up such that those paging channels indicating activity are monitored by the communication device.

14. The apparatus of claim 13, wherein the predetermined bits include at least four bits punctuating a Walsh code of 0 comprising the pilot channel signal, the at least four bits indicating which of the paging channels are active.

15. The apparatus of claim 14, wherein the at least four bits are located at predetermined locations within a slot of data, the at least four bits indicating which of the paging channels are active.

16. The apparatus of claim 13, wherein activity indicated by the predetermined bits directs the digital receiver circuitry and the digital signal processor to acquire a synchronization channel of the radio communication system so as to synchronize timing of the communication device to the radio communication system and to acquire and read those paging channels indicating activity.

17. The apparatus of claim 13, wherein the analog receiver circuitry, the digital receiver circuitry and the digital signal processor are powered down after those paging channels indicating activity have been monitored by the communication device and any incoming calls received by the radio communication device have been completed.

18. A radio communication system for reducing power consumption in a radiotelephone, comprising:
   a base station, said base station configured to transmit a pilot channel signal punctuated by predetermined bits indicating paging activity on particular paging channels; and
   at least one radiotelephone having analog and digital receiver circuitry to receive signals from the radio communication system and provide a baseband demodulated data stream, the digital receiver circuitry including searcher circuitry to detect a common pilot channel signal in the data stream and a digital signal processor including call processor circuitry in a portion thereof, the digital signal processor to decode messages in the data stream, the call processor to retrieve predetermined bits of the pilot channel indicating activity on paging channels of the radio communication system, the radiotelephone configured to periodically power up the analog receiver circuitry, the searcher circuitry, and the call processor circuitry from an initial sleep mode such that the call processor can read the predetermined bits of the pilot channel signal indicating activity on paging channel of the radio communication system such that:
      where no paging activity is indicated by the predetermined bits of the pilot channel signal, the radiotelephone powers down the analog receiver circuitry, the searcher circuitry, and the call processor circuitry, and
      where paging activity is indicated by the predetermined bits of the pilot channel signal, the radiotelephone powers up the digital receiver circuitry and digital signal processor circuitry to read those particular paging channels.

19. The radio communication system of claim 18, wherein the base station is part of at least one of a personal digital cellular (PDC) system, a Japan digital cellular (JDC) system, a code division multiple access (CDMA) system, a direct sequence code division multiple access (DS-CDMA) system, a groupe speciale mobile (GSM) system, and a slotted paging mode groupe speciale mobile (GSM-DRX) system.

* * * * *